United States Patent
Morrison et al.

(10) Patent No.: US 6,789,671 B2
(45) Date of Patent: Sep. 14, 2004

(54) STRAP PROTECTION AND STORAGE DEVICE

(76) Inventors: Gregory Morrison, 4743 Bradley Blvd., Apartment 103, Chevy Chase, MD (US) 20815; William Heiberg, 6600 Broad St., Bethesda, MD (US) 20816

(*) Notice: Subject to any disclaimer, the term of this patent is extended or adjusted under 35 U.S.C. 154(b) by 118 days.

(21) Appl. No.: 10/228,104

(22) Filed: Aug. 27, 2002

(65) Prior Publication Data

US 2004/0040870 A1 Mar. 4, 2004

(51) Int. Cl.[7] .............................................. B65D 85/67
(52) U.S. Cl. ....................... 206/388; 224/318; 410/97; 410/100
(58) Field of Search ................................. 24/16 R, 300; 114/230.2, 347, 361; 206/388, 442; 224/318; 410/96, 97, 100; 119/795, 797

(56) References Cited

U.S. PATENT DOCUMENTS

| 4,694,541 A | * | 9/1987 | Skyba ........................... 24/301 |
| 5,050,924 A | * | 9/1991 | Hansen ................... 296/100.15 |
| 5,193,955 A | | 3/1993 | Chou |
| 5,577,653 A | | 11/1996 | Bieker |
| 6,019,067 A | | 2/2000 | Carey |
| 6,085,695 A | | 7/2000 | Miller et al. |
| 6,202,263 B1 | * | 3/2001 | Harker ......................... 24/300 |
| 2003/0173384 A1 | * | 9/2003 | Clark et al. ................. 224/314 |

* cited by examiner

Primary Examiner—Jim Foster
(74) Attorney, Agent, or Firm—Richard C. Litman

(57) ABSTRACT

A strap protection and storage device designed to protect a strapped down piece of equipment from buckle damage and also secure the free end of the strap from causing damage or loosening the strap itself. The device has two sheaths, one being more elongated than the other, that are connected by a tether. A storage bag is attached to the longer of the two sheaths.

6 Claims, 3 Drawing Sheets

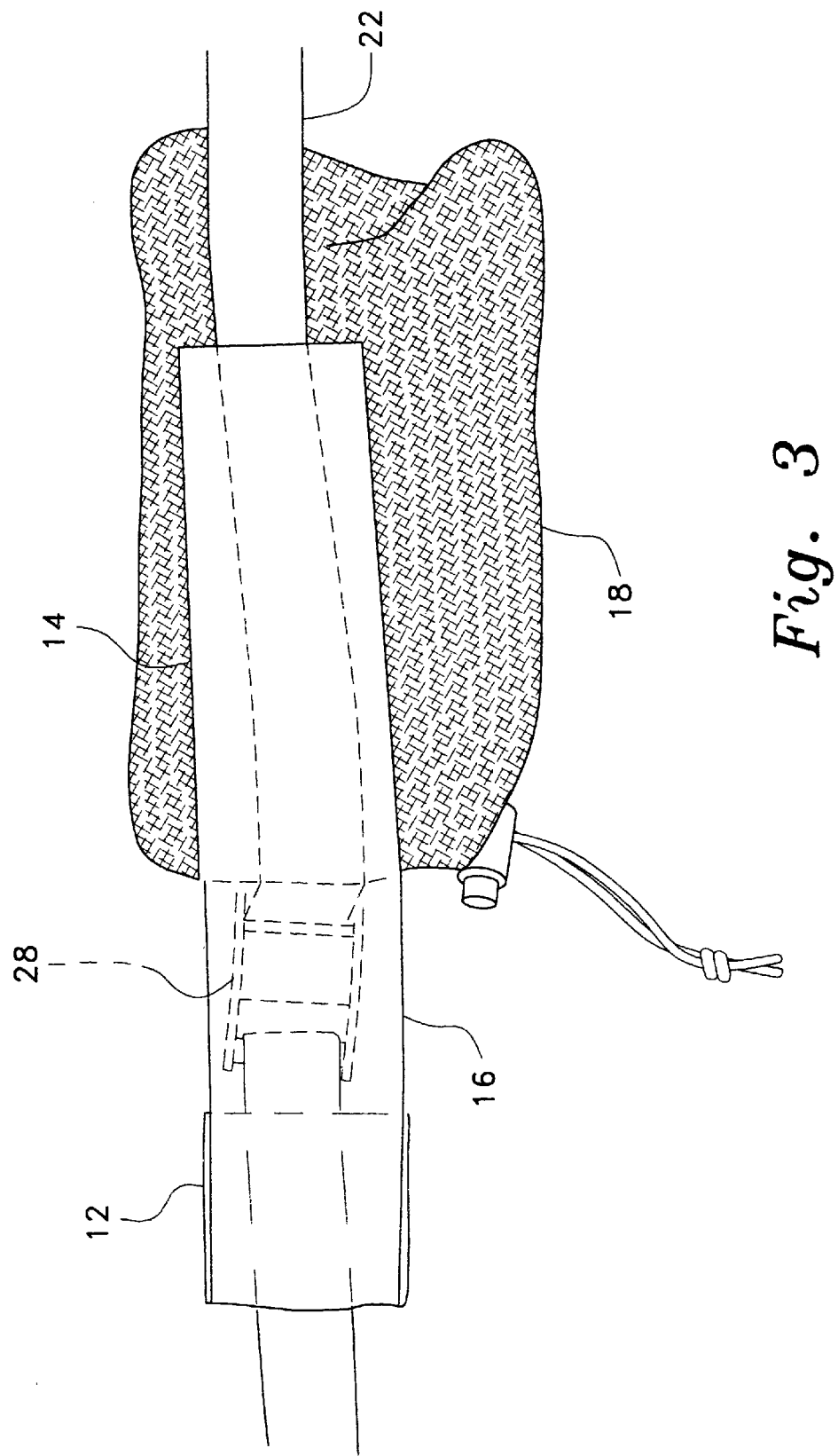

STRAP PROTECTION AND STORAGE DEVICE

BACKGROUND OF THE INVENTION

1. Field of the Invention

The present invention relates generally to tie down straps. More specifically, the invention is a strap protection and storage device having two sheaths, connected by a tether, that are designed to function as strap guides, in combination with a strap storage bag attached to one sheath.

2. Description of the Related Art

In recent years there has been an explosion in the number of participants in different outdoor and/or extreme sports. Unfortunately, many of these new sports require an extreme amount of equipment that can be expensive, cumbersome, and unwieldy. One way to haul this equipment is to secure it to a roof rack or truck bed with one or several straps.

Elastic or rubber straps are often used for strapping down equipment. The drawback to these types of straps is that they must be stretched into position in order to work. The proper size strap must be used for the job with little tolerance for different equipment sizes. The same strap cannot be used for all applications An improvement over the elastic strap is the well known cam strap. The cam strap has a looped end and a free end. The looped end has a cam buckle permanently secured thereto. When in use, the free end is looped around the equipment and the fixture to which the equipment is to be secured to. The free end is then fed through the cam buckle and pulled tight, causing the entire strap to gain tension and thereby hold the equipment in position.

While the cam strap may be an effective and useful fastening device, it is not without its drawbacks. The cam buckle can chafe or scratch the equipment it is securing. Also, the free end of the strap can flap wildly when traveling, which can also damage the associated equipment, can cause the strap to loose tension, and creates an annoying noise which can be distracting when driving.

An additional problem with current straps is that they often become tangled or knotted when not in use. The present invention is a specially designed strap protection and storage device that protects equipment from cam and free end damage, and provides a storage place for the strap when not in use.

The related art is replete with numerous types of straps and bags attached to or capable of being attached thereto. None of these inventions solves the above-mentioned problems or incorporates the features of the present invention.

U.S. Pat. No. 6,085,695 to Miller et al. discloses a universally attachable leash bag. The device consists of a sheath-like bag that cinches at both ends so as to be securable to a leash.

U.S. Pat. No. 6,019,067 to Carey describes an animal restraint storage receptacle. The receptacle is a bag that is attachable to a strap by way of two sheaths.

U.S. Pat. No. 5,577,653 to Bieker describes a blood collection tube holder. Bieker describes a sack that is integrated with a strap. The sack has several compartments defined therein for storing vials.

U.S. Pat. No. 5,193,955 to Chou describes a binding device for cargos. The binding device consists of a net member, a plurality of strap tensioners, a plurality of intermediate cargo strap members and a plurality of strap tensioners.

None of the above inventions and patents, taken either singularly or in combination, is seen to describe the instant invention as claimed. Thus, a device to secure strap on gear of vehicle solving the aforementioned problems is desired.

SUMMARY OF THE INVENTION

The present invention is a strap protection and storage device for a strap, and particularly a cam strap having a buckle and a strap made of webbing, which is designed to protect strapped down equipment from strap buckle damage, and is designed to secure the free end of the strap when the strap is in use, and to store the entire strap when not in use. The invention has an elongated flat back piece and two flat front pieces. The front pieces are disposed upon the back piece so as to define two distinct sheaths tethered together. A storage bag having a drawstring about its mouth is attached to one of the sheaths. When the strap is used to tie a kayak, canoe, or the like to the roof of a vehicle for transport, the strap is threaded through the two sheaths with the cam buckle overlying the tether, and the excess strap is stored in the storage bag. When the strap is not in use, the strap is stored in the storage bag.

Accordingly, it is a principal object of the invention to provide a strap protection and storage device for a tie-down strap which provides storage for the strap when not in use, and which provides protection for equipment tied down by the strap from damage caused the buckle or by the loose free end of the strap.

It is another object of the invention to provide a device to contain the free end of a tie-down strap to prevent the free end from flapping around and loosening during travel.

It is a further object of the invention to provide a device to prevent the strap buckle of a tie-down strap from damaging the equipment being secured.

Still another object of the invention is to provide a device which is capable storing an entire tie-down strap when the strap is not in use, and which is also capable of protecting the equipment from damage caused by the strap when in use.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a rear elevational view of the present invention.

Similar reference characters denote corresponding features consistently throughout the attached drawings.

DETAILED DESCRIPTION OF THE PREFERRED EMBODIMENT

Figure 1:
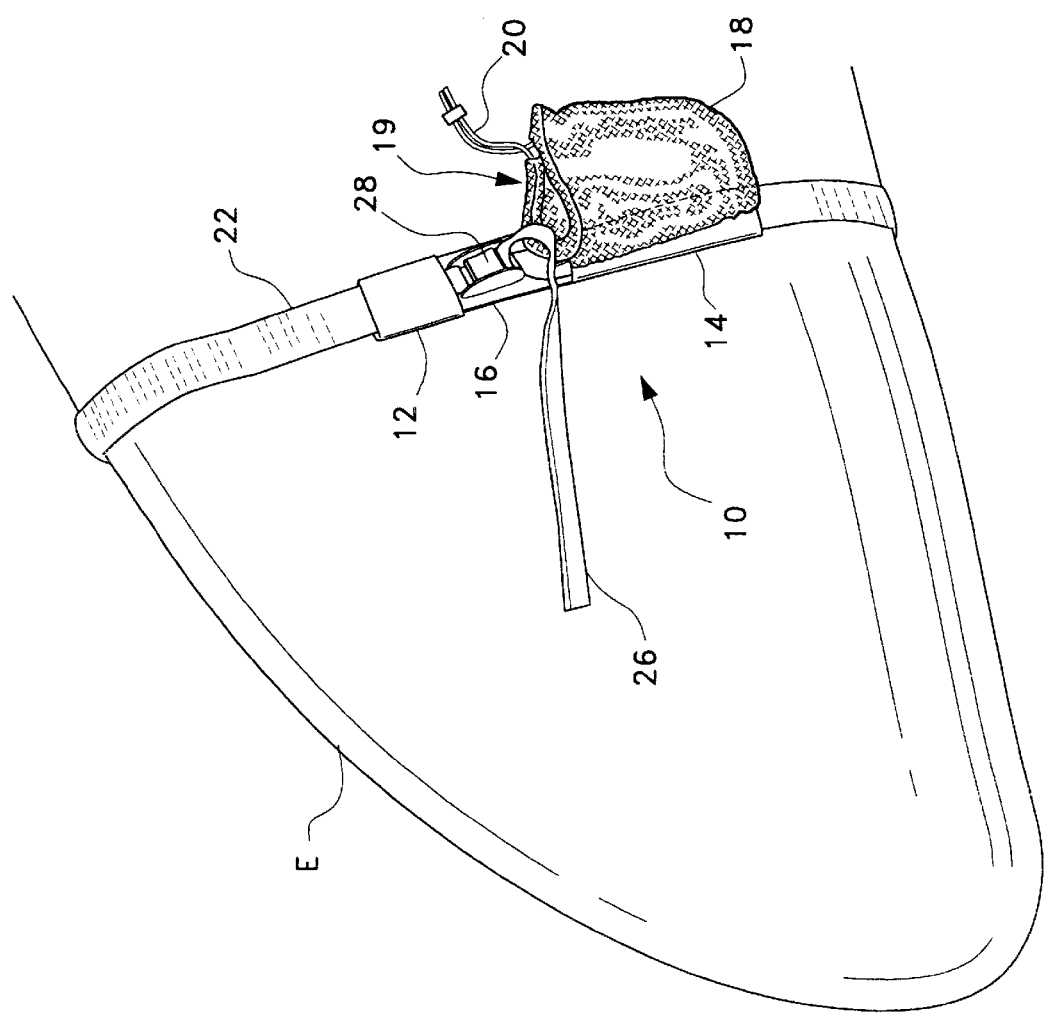
FIG. 1 is an environmental, perspective view of a device to secure strap on a boat gear loaded on a vehicle according to the present invention.
Figure 2:
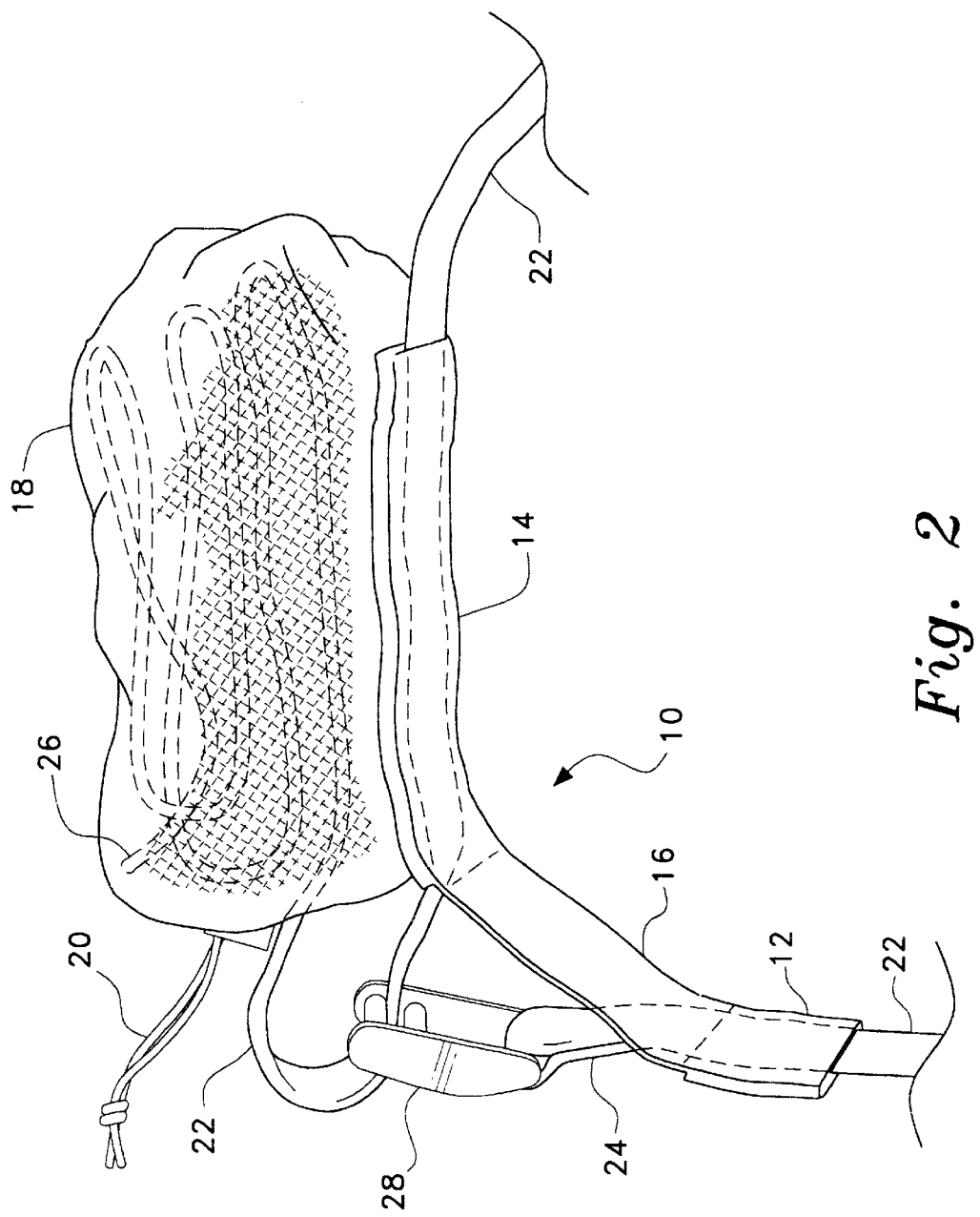
FIG. 2 is side perspective view of the present invention with the free end of a strap being secured in the closeable bag.

The present invention, as shown in FIGS. 1, 2, and 3, is a strap protection and storage device, designated generally as 10 in the drawings. The device 10 has two sheaths 12, 14 connected by a tether 16. The first sheath 12 is generally flat and has two open ends. The second sheath 14 also is flat and has two open ends, but is elongated and is connected to a storage bag 18. The dimensions of the second sheath 14 must be large enough to provide a sufficient attachment surface for the bag 18. Both sheaths 12, 14 are dimensioned to allow a standard sized binding strap to be easily threaded there through so that the sheaths 12 and 14 function as a guide for the strap.

The storage bag 18 preferably has one open end 19 that can be closed with an attached drawstring 20. The drawstring 20 has a bullet toggle for preventing the bag 18 from re-opening when the drawstring 20 has been pulled taut. The bag 18 must be large enough to accommodate the entire length of a large strap 22 (discussed below). The bag 18 is preferably constructed of a nylon mesh but any suitable material such as canvas, nylon or polyester may also be used.

The present invention is ordinarily used in connection with a cam strap 22. The cam strap 22, as best illustrated in FIG. 2, has a looped end 24 and a free end 26. The looped end 24 is looped around a cam buckle 28, and sewn back upon itself, thereby becoming attached to the buckle 28. Cam buckles 28 are well known in the art and their use is preferred but is not a critical element of the invention. Other buckle designs may also be incorporated. The strap 22 is made from nylon webbing or similar material.

When in use, as illustrated in FIG. 1, the free end 26 of the strap 22 is fed through the first sheath 12, around the equipment E to be secured, through a securing fixture on the vehicle roof (not shown), through the second sheath 14, and then into the cam buckle 28. The strap 22 is then pulled taut, and the free end 26 and any associated slack is then stored inside the bag 18, as best illustrated in FIG. 2. When not in use, the strap 22 may be removed from the sheaths 12, 14 and inserted into the bag 18, in its entirety, for storage.

The tether 16 must be thick and durable enough to protect any secured equipment from being damaged by the buckle 28. Nylon webbing is a preferred material, but canvas and neoprene are also suitable. The strap 22 is ordinarily made of nylon webbing but any suitable high strength flexible material may be used.

It is to be understood that the present invention is not limited to the embodiment described above, but encompasses any and all embodiments within the scope of the following claims.

We claim:

1. A strap protection and storage device, comprising:
   a first sheath having first and second open ends;
   a second elongated sheath having first and second open ends;
   a tether, the tether being disposed between the second end of said first sheath and the first end of said second sheath;
   a storage bag having an open end, the bag being disposed on said second sheath.

2. A strap protection and storage device as in claim 1, wherein said first sheath, said second sheath, said tether, and said bag are each made from a material selected from the group consisting of nylon, neoprene, polyester, canvas, or leather.

3. A strap protection and storage device as in claim 1, further including a drawstring disposed around the open end of said bag.

4. A strap protection and storage device as in claim 1, wherein said bag is constructed from a mesh material.

5. A strap protection and storage device as in claim 1, further comprising:
   an adjustable strap, the strap having a looped end, a free end, and a buckle;
   wherein said looped end is disposed upon said buckle;
   wherein said strap is disposed inside both said sheaths with the looped end being disposed in said first sheath.

6. A strap protection and storage device, comprising:
   a first sheath having first and second open ends;
   a second elongated sheath having first and second open ends;
   a tether, the tether being flat and disposed between the second end of said first sheath and the first end of said second sheath;
   a storage bag having one open end, the bag being disposed on said second sheath;
   a drawstring disposed around the open end of said bag; and
   an adjustable strap, the strap having a looped end, a free end, and a buckle;
   wherein said looped end is disposed upon said buckle;
   wherein said strap is disposed inside both said sheaths with the looped end being disposed in said first sheath; and
   wherein said buckle is a cam type buckle.

* * * * *